United States Patent

[11] 3,569,932

| [72] | Inventor | Dana L. Reed, Jr. |
| | | 11 Walsh Drive, Dumont, N.J. 07628 |
| [21] | Appl. No. | 658,568 |
| [22] | Filed | Aug. 4, 1967 |
| [45] | Patented | Mar. 9, 1971 |

[54] VISUAL INDICATOR OF DEGREE OF TURN OF A STEERING WHEEL
7 Claims, 6 Drawing Figs.

[52] U.S. Cl. .................................................. 340/73, 340/30, 200/61.3
[51] Int. Cl. .................................................. B60q 1/34
[50] Field of Search .......................................... 340/30, 54, 55, 56, 73, 74, 87; 200/152, 152.7, 61.47, 61.3; 116/26, 28

[56] References Cited
UNITED STATES PATENTS
2,302,098  11/1942  Birk et al. .....................  200/152X Primary Examiner—Alvin H. Waring
Attorney—Berman, Davidson and Berman ABSTRACT: An indicator for use on, or in connection with, a steering wheel for vehicles or vessels comprising an interconnected pair of spiral channels lying on opposite sides of a rotatable disc, said disc being responsive to rotation of such steering wheel, and a gravity-responsive member freely movable in said channel.

Patented March 9, 1971
3,569,932
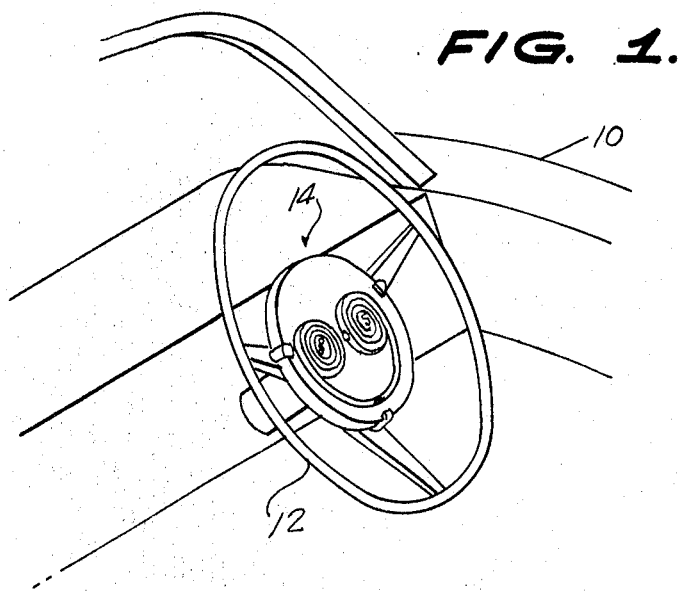
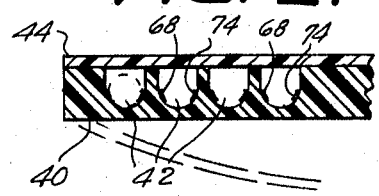
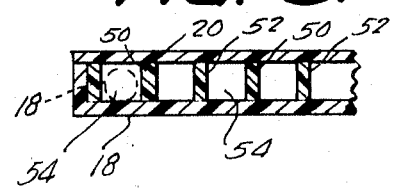
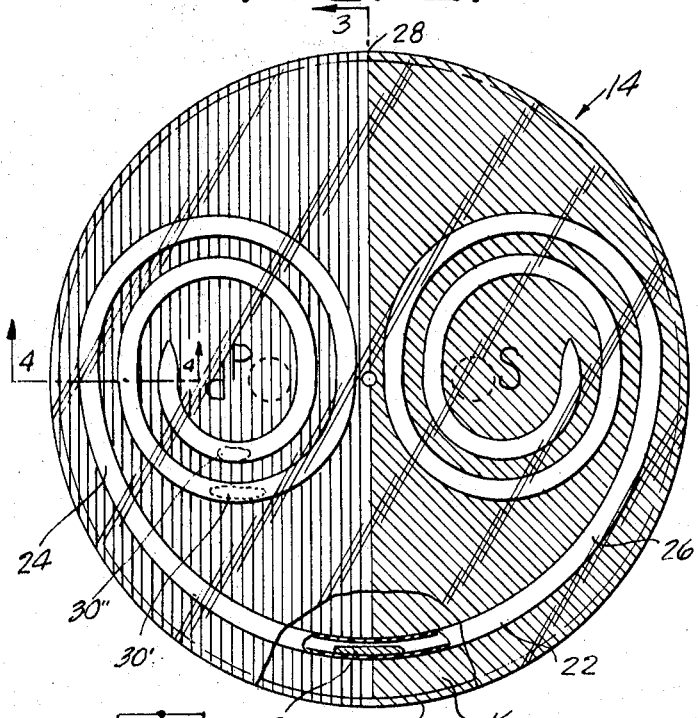
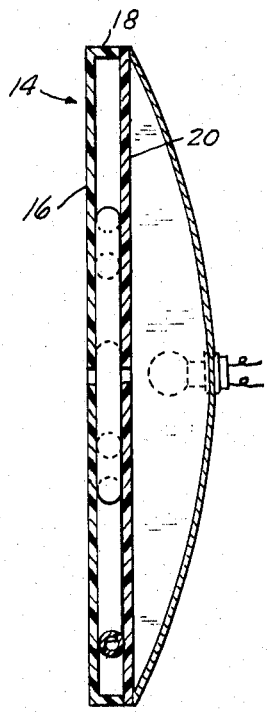
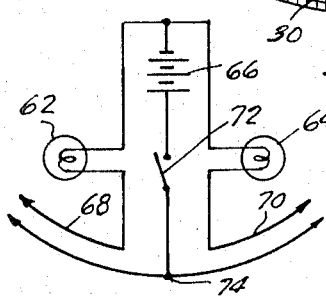
INVENTOR.
DANA L. REED, JR.
BY Berman, Davidson & Berman
ATTORNEYS

VISUAL INDICATOR OF DEGREE OF TURN OF A STEERING WHEEL

This invention relates to an indicator providing instant visual indication of how far the steering wheel of a vehicle or vessel has been turned to the right or left (in the case of a vessel, port or starboard) from its neutral or straight ahead position.

It is an object of this invention to provide an indicator as aforesaid which will be positive in operation and which will provide unmistakable indication.

It is a further object of this invention to provide an indicator as aforesaid which will be easy to read and which may be cheaply and easily manufactured.

The above and other objects will be made clear from the following detailed description taken in connection with the annexed drawing, in which:

FIG. 1 is a perspective view showing the steering wheel of a boat, with the indicator of this invention attached thereto;

FIG. 2 is a top plan view of the indicator of FIG. 1, with parts in cross section;

FIG. 3 is a section on the line 3—3 of FIG. 2;

FIG. 4 is a section on the line 4—4 of FIG. 2, but illustrating a different form of channel;

FIG. 5 is a section similar to FIG. 4, illustrating still another form of channel; and FIG. 6 is a wiring diagram showing a preferred but optional feature of the invention.

The device of this invention is applicable to the steering wheel of an automobile but enjoys its greatest advantage and offers the user its greatest convenience when used in connection with the steering of a vessel or aircraft and will be described hereinafter with particular reference to the steering wheel of a boat. Generally speaking, the utility of the present invention increases with the timelag which occurs between movement of the steering wheel and response of the vessel being steered. In the case of an automobile, response of the vehicle to turning of the steering wheel is virtually instantaneous and in the case of a boat having an outboard motor where the propeller thrust is in the horizontal plane and turnable for steering about a vertical axis, response also is virtually instantaneous. Where, however, a propeller rotates about a fixed horizontal axis and the thrust is along the centerline of the boat, steering is accomplished by reaction of the rudder to the forward motion of the boat and the response is by no means instantaneous. The same thing, of course, is true in general of airplanes.

Speaking generally of inboard power craft, the longer the craft, the longer is the timelag between a turn of the steering wheel and response of the craft to such turn. There is also a strong inertia factor so that when the wheel is turned and the craft begins to respond, it will continue to respond even through the rudder immediately be returned to its neutral or straightforward position. Skillful maneuvering, therefore, requires a very considerable degree of skill or know-how on the part of the steersman.

The present invention has as its primary function speeding up the acquisition of the requisite skill or know-how as between a particular steersman and a particular craft. By providing a visual indication of the extent to which the wheel is turned, the steersman is offered a focal point on which to base observations as to timelag and inertia effect and thereby much more rapidly acquires the "feel" of the particular craft. No two craft, however, steer exactly alike even though ostensibly they are identical in design and proportions and for the steersman of a newly acquired craft, the focal point of observation provided by the present indicator, greatly can speed up the time required to become truly proficient as a steersman. Even an experienced steersman will find this indicator helpful in a tight docking area.

The foregoing comments as to the difficulty in becoming a good steersman of a power-driven boat apply also to the steering of a sailboat in cases where a wheel rather than a tiller is used for steering purposes. Since the steering effort must be related not only to the desired course but to the sail setting and the wind direction, it is a legitimate claim, therefore, that the present invention contributes equally to steersmanship under sail.

Referring now to FIG. 1, there is shown a boat 10 having a conventional steering wheel 12, the center of which is affixed to the improved indicator designated generally by the numeral 14. As best seen in FIGS. 2 and 3, the indicator 14 is made up of a lower cup-shaped member 16 having an annular flange 18 to which is joined a transparent cover plate 20.

A tube 22 which may be either of glass or transparent plastic is formed into a pair of coils 24 and 26 which lie on opposite sides of the vertical center line 28 of the indicator 14. The surface of the member 16 preferably is colored red on the left or port side, as indicated by vertical shading in FIG. 2, and green on the right or starboard side on the centerline, as indicated by diagonal shading, and there is, at the center of coil 26, the letter S to indicate starboard and in the center of the opposite coil two letters P, one being reversed with respect to the other, so that they may be properly read no matter what the position of the wheel. A glob of mercury 30 is sealed into the tube 22 and when the indicator 14 is in its neutral position, as shown in FIG. 2, the mercury 30 occupies the bottom of the tube 22 and is bisected by the vertical centerline 28. All of this is clearly visible through the transparent cover plate 20.

If, from the position shown in FIG. 2, the indicator 14 is turned 360° to the left or port, the mercury 30 will have moved to the position 30', while a second full 360° turn would place the mercury at the position 30". It is clear, therefore, that at all times there is a clear indication of precisely how far the wheel 12 and therefore the indicator 14 have been turned. A similar turn to starboard or right would produce precisely similar positions 30' and 30" for the mercury but these would appear in the opposite coil. While the indicator 14, as shown, will not indicate more than 90° over two full turns, obviously, the convolutions may be increased as desired or as rendered necessary by the steering gear of the boat.

FIG. 4 shows an alternative construction in which the base plate 40 is a single piece of plastic having grooves 42 molded therein and the grooves are enclosed by a cover plate 44. In plan view, the grooves 42 would appear precisely the same as the tube 22 in FIG. 2.

In FIG. 5, the base cup member 16 is the same, as shown in FIGS. 2 and 3, as is the transparent cover plate 20. In FIG. 5, however, a channel for the indicating element 30 is formed by winding up parallel coils 50 and 52 of metal which between them define a channel 54 similar to that defined by the tube 22 of FIG. 2 or the molded grooves 42 in FIG. 4. It will be well, in this case, to substitute for the mercury 30 a steel or other ball having rolling clearance within the channel and in fact such substitution could be made in any of the forms heretofore discussed.

In handling a boat at night where there is normally no light immediately over the steering wheel, it is possible to provide indicator lights so that one can tell at a glance the set of the wheel and therefore the rudder. This is accomplished by providing at the bottom of the indicator a reflector member 60 which overlies the bottom of the indicator and has a dividing partition corresponding to the line 28 in FIG. 2. A lamp 62 is mounted inside the port side of the reflector, while a similar light 64 is mounted on the starboard side.

As shown in FIG. 6, a battery 66 has one terminal connected in parallel to the lights 62 and 64, each of which has connections to an electrode, respectively, 68 and 70. The opposite terminals of battery 66 goes through an on-off switch 72 to a second electrode 74. As shown in FIG. 4, the electrodes extend throughout the convolutions of the tube and the actual indicating member 30 (whether mercury or a steel ball) will energize both lights 62 and 64 when the wheel is in neutral position. If the wheel is turned to either port or starboard, it will light only 62 and 64 which will remain lighted until the neutral position is reachieved. Thus, upon entering a boat at night, it is only necessary to close the switch 62 to provide an exact indication of the rudder position at the time and the light 62 or 64, showing through the indicator at all times, will provide a more accurate indication of precisely where the member 30 is in the port or starboard set of grooves or tubes.

This disclosure has been related to a steering wheel. It is, however, useful to indicate the amount and direction of turning of a variety of wheels, for example, the control wheel on a globe or gate valve.

While specific forms of this invention have been disclosed and discussed, it is clear that these forms are susceptible to modification by those skilled in the art without departure from the concept of this invention. This invention, therefore, is not to be limited to the precise details disclosed herein.

I claim:

1. A visual indicator responsive to the turning of a wheel, said indicator comprising: an enclosed channel, the ends of which extend to form a pair of oppositely wound coils each having a plurality of convolutions and lying to right and left of a centerline representing the neutral position of a wheel, and a freely movable, gravity-actuated member in said channel, said channel being, in part at least, transparent throughout its length.

2. An indicator as set forth in claim 1, in which said channel is formed in a plastic base member and said base member has a transparent lid completing the enclosure of said channel.

3. An indicator as set forth in claim 1, in which said channel is defined on two sides by parallel strips of material.

4. An indicator as set forth in claim 3, in which said channel is completed on one side by the bottom of a flat-bottomed plastic cup containing said strips and on the other side by a transparent lid for said cup.

5. An indicator as set forth in claim 4, in which said gravity-actuated member is a ball.

6. An indicator as set forth in claim 4, in which said gravity-actuated member is a body of mercury.

7. An indicator as set forth in claim 1, including separate lights to indicate whether the wheel is turned right or left and means to energize a selected one of said lights by such turning of the wheel.